United States Patent [19]
Knowles et al.

[11] Patent Number: 5,648,643
[45] Date of Patent: Jul. 15, 1997

[54] ACOUSTIC WAVE TOUCH PANEL WITH INLAYED, ETCHED ARRAYS AND METHOD OF MAKING THE PANEL

[76] Inventors: Terence J. Knowles, 7525 Taft Cir., Hanover Park, Ill. 60103; Charles F. Bremigan, III, Rte. 1, Box 189R, Jarrell, Tex. 76537

[21] Appl. No.: 491,306

[22] Filed: Jun. 16, 1995

[51] Int. Cl.⁶ .................................................. G08C 21/00
[52] U.S. Cl. .............................. 178/19; 345/177; 367/707
[58] Field of Search .................................. 178/18, 19, 20; 345/177; 367/118, 127, 902, 907; 364/709.01, 709.1, 709.11

[56] References Cited

U.S. PATENT DOCUMENTS

| | | | |
|---|---|---|---|
| 5,072,427 | 12/1991 | Knowles | 367/118 |
| 5,157,327 | 10/1992 | Henley | 324/158 R |
| 5,162,618 | 11/1992 | Knowles | 178/18 |
| 5,253,187 | 10/1993 | Kaneko et al. | 178/19 |
| 5,260,521 | 11/1993 | Knowles | 178/19 |
| 5,308,936 | 5/1994 | Biggs et al. | 178/19 |
| 5,329,070 | 7/1994 | Knowles | 178/18 |
| 5,379,269 | 1/1995 | Sindeband et al. | 367/127 |
| 5,451,723 | 9/1995 | Huang et al. | 178/18 |
| 5,484,967 | 1/1996 | Yanagisawa | 178/19 |
| 5,573,077 | 11/1996 | Knowles | 178/19 |

*Primary Examiner*—Curtis Kuntz
*Assistant Examiner*—Paul Loomis

[57] ABSTRACT

An acoustic wave touch panel comprising a substrate formed of a first material. The substrate is capable of supporting an acoustic wave for propagation therein. A reflective array upon the substrate is provided for reflecting an acoustic wave to propagate in the substrate. The reflective array is formed in the substrate. An inlay is formed of a second material. The inlay is disposed in the reflective array, wherein the acoustic wave has a velocity of propagation in the second material that is slower than the velocity of propagation of the acoustic wave in the first material.

30 Claims, 2 Drawing Sheets

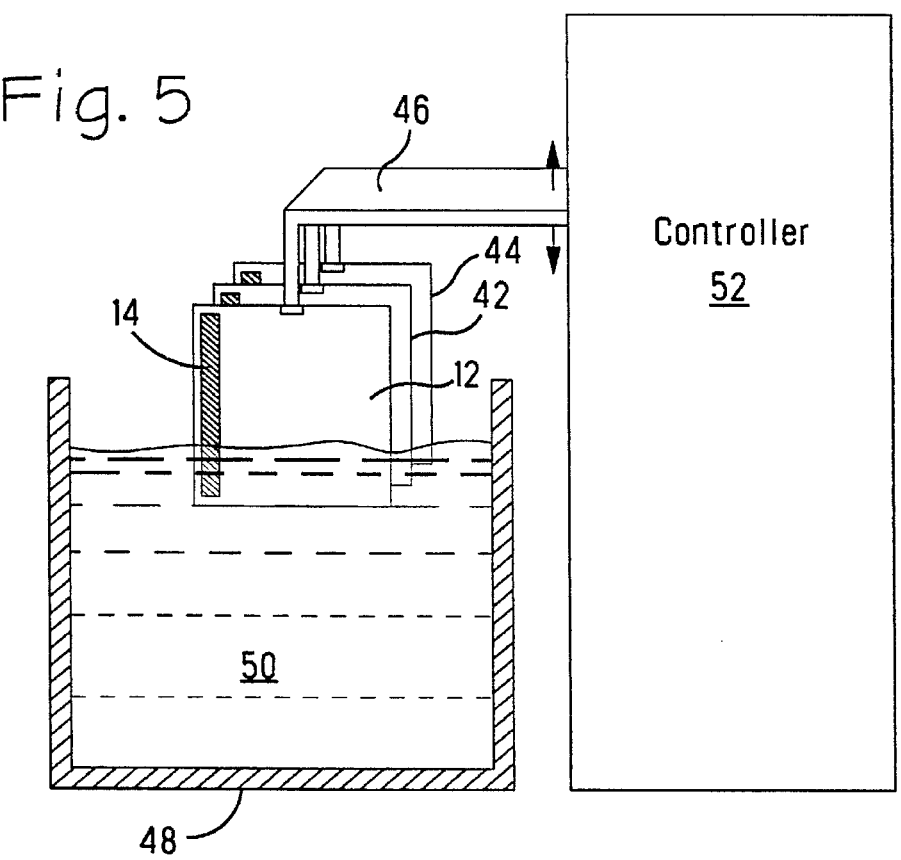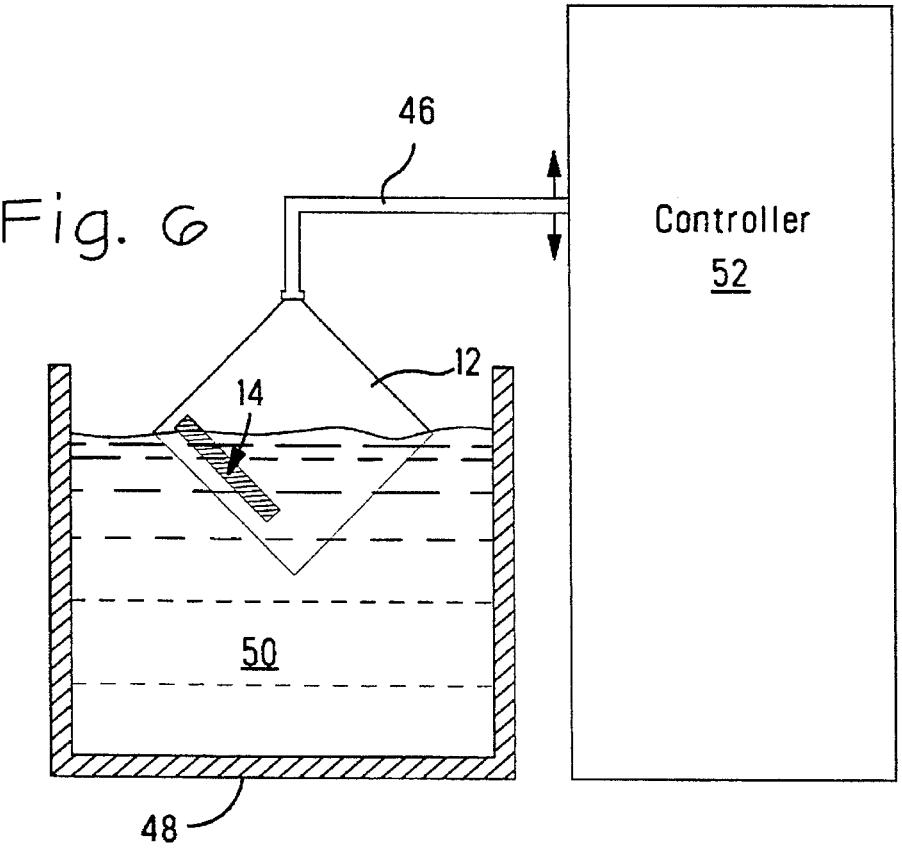

5,648,643

ACOUSTIC WAVE TOUCH PANEL WITH INLAYED, ETCHED ARRAYS AND METHOD OF MAKING THE PANEL

TECHNICAL FIELD

The present invention relates to an acoustic wave touch panel and a method of making the panel. More particularly the present invention relates to an acoustic wave touch panel having reflective arrays formed in the panel's substrate by removal of a portion of the substrate material in a desired array pattern where the arrays are inlaid with a second material that improves guiding of desired acoustic waves and that minimizes the generation of spurious acoustic waves.

BACKGROUND OF THE INVENTION

Acoustic wave touch position sensors are known to include a touch panel with a substrate on which transducers are mounted or coupled to in order to impart an acoustic wave traveling along a first axis of the panel. These known sensors also include an array of reflective elements extending along the first axis wherein each of the reflective elements is typically at a 45° angle with respect to the longitudinal axis of the array, the first axis. The elements of the array reflect portions of the acoustic wave imparted into the panel along a number of parallel paths of differing lengths such that these parallel paths extend across a touch region of the panel.

These reflective arrays are typically formed by screening glass frit with a stencil of the desired array pattern on the top surface of the panel. The arrays have been formed with a constant height and they have also been formed with a variable height. It has been found that variable height reflective arrays are preferable for certain types of acoustic waves such as shear waves. Variable height screened arrays, however, can be difficult to cost-effectively manufacture in large quantities.

SUMMARY OF THE INVENTION

In accordance with the present invention, the disadvantages of prior acoustic wave touch panels having reflective arrays have been overcome. The acoustic wave touch panel of the present invention includes a reflective array of variable depth that is easily manufactured where the array is inlaid to improve guiding of desired acoustic waves, increase reflectivity, and to minimize the generation of spurious waves.

More particularly, in an embodiment of the invention an acoustic wave touch panel includes a substrate formed of a first material. The reflective array is formed in the substrate. An inlay formed of a second material is disposed in the reflective array wherein the acoustic wave has a velocity of propagation in the second material of the inlay that is slower than the velocity of propagation of the acoustic wave in the first material of the substrate.

In other embodiments of the invention, the reflective array has a variable depth along it, but the array may be easily and economically formed by stamping if the substrate is of a material such as a plastic or by etching if the substrate is of a material such as glass. In order to obtain a variable depth array by etching, the substrate is immersed into an etched tank and withdrawn from the etch tank at a controlled rate to obtain a reflective array having the desired depth profile along its length.

These and other objects, advantages and novel features of the present invention, as well as details of an illustrated embodiment thereof, will be more fully understood from the following description and the drawing.

BRIEF DESCRIPTION OF THE DRAWINGS

FIG. 5 is a schematic illustration of a control system for etching variable depth reflective arrays.

FIG. 6 is a schematic illustration of the control system of FIG. 5 with the acoustic wave touch panel mounted so as to obtain variable depth arrays with reflective elements having uniform depths.

DESCRIPTION OF THE PREFERRED EMBODIMENT

Figure 1:
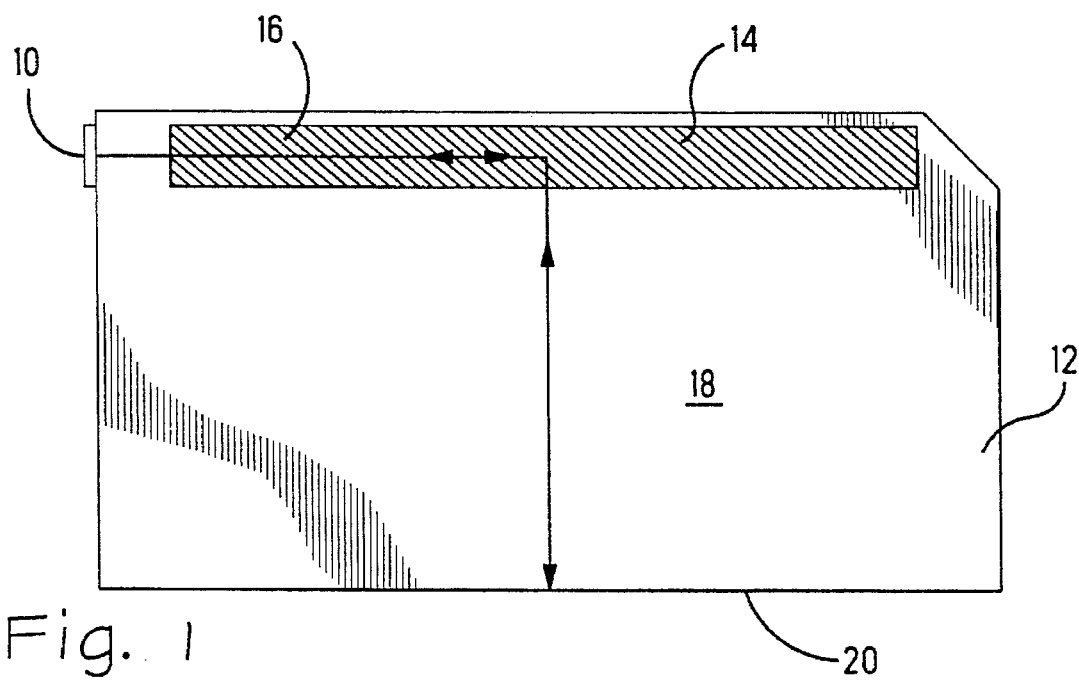
FIG. 1 is a top view of an acoustic wave touch panel having a single reflective array.

An acoustic wave touch panel with variable depth arrays in accordance with the present invention is shown in FIG. 1. The acoustic wave touch panel includes a transducer 10 that is mounted on an edge of an acoustic wave touch panel substrate 12. The transducer 10 may be polarized to launch an acoustic wave such as a shear wave into the panel substrate 12 along a longitudinal axis of a reflective array 14. The reflective array 14 is formed in the substrate by the removal of portions of the substrate material in a pattern defining the array. The reflective array 14 includes a large number of individual reflective elements 16 that are disposed along the length of the array 14 at an angle with respect to the longitudinal axis of the array. Preferably the angle is 45° to the longitudinal axis of the array. Each of the reflective elements 16 of the array 14 reflects a portion of the shear wave propagating along the array across a touch region 18 of the acoustic wave touch panel. The reflected shear waves are reflected back to the array 14 by a reflective edge 20 of the panel substrate 12. The reflective array 14 in turn reflects the shear waves back to the transducer 10 which is coupled to circuitry to detect a perturbation in the transducer signal indicating a touch on the touch region 18 of the panel 12. The operation of such an acoustic wave touch position sensor is described in detail in U.S. Pat. No. 5,162,618 incorporated herein by reference.

Figure 2:
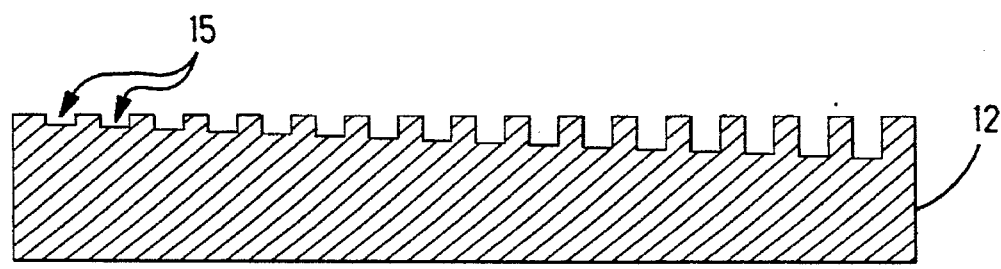
FIG. 2 is a cross-sectional view of the acoustic wave touch panel substrate shown in FIG. 1 taken through the reflective array.

In order to provide a constant amplitude of the acoustic waves reflected by the reflective array 14, the reflective array 14 is formed having a variable array depth elements 15 as illustrated in FIG. 2. By forming the reflective array 14 that has various array depths elements 15 across the longitudinal axis of the array 14 with reflective elements 16, the reflectivity at points along the array 14 is increased as the distance of the points along the array 14 from the transducer 10 increases. The depth of each element 15 in the reflective array 14 is such that the power reflectivity per unit length of the reflective array, σ (x), is given to first approximation, neglecting diffraction and multiple reflections by the following equation:

$$\sigma(x) = \frac{\alpha}{\left[1 + \frac{\alpha}{\sigma_L}\right] \exp^{\alpha(L-x)} - 1} \quad \text{eq. 1}$$

where the ratio of the depth of the array at x to the depth of the first array element (x=0) is given by the equation:

$$\frac{d(L)}{d(0)} = \left\{ \frac{\left[1 + \frac{\alpha}{\sigma_L}\right] \exp^{\alpha L} - 1}{\left[1 + \frac{\alpha}{\sigma_L}\right] \exp^{\alpha(L-x)} - 1} \right\}^{1/2} \quad \text{eq. 2}$$

and the ratio of the depth of the last array element and the first array element is given by the following equation:

$$\frac{d(L)}{d(0)} = \left\{ \frac{\left[1 + \frac{\alpha}{\sigma_L}\right] \exp^{\alpha L} - 1}{\left[\frac{\alpha}{\sigma_L}\right]} \right\}^{1/2} \quad \text{eq. 3}$$

where $\alpha$ represents the power absorbtivity of the array per unit length, x is a variable representing the distance from the start of the array and L represents the length of the array. To design a variable depth array, of length L, a practical maximum value for the depth, d(L), is assigned and substituted into equation 3 together with experimentally measured values for $\alpha$ and $\sigma_L$, and array length L, to determine d(0). Thereafter, these values etc. are substituted into equation 2 to determine the depth of the array as a function of distance.

In order to improve the acoustic wave beam guiding properties of the variable depth reflective array 14, each of the elements 16 of the reflective array is inlaid with a material that is different than the material used to form the substrate 12 of the acoustic wave touch panel. In particular, the inlay material 30 should be such that the acoustic wave to be reflected by the array 14 should have a velocity of propagation in the inlay material 30 that is different than the velocity of propagation of the acoustic wave in the material forming the substrate 12. Further, the ratio of the density to the shear modulus of the inlay material should be less than the ratio of the density to shear modulus of the material forming the substrate 12. Moreover, in particular, the inlaid arrays slow down the acoustic waves and increase guiding of the acoustic wave beams to allow practical acoustic wave touch panels to be made in large sizes and/or curved. The inlaid arrays further minimize conversion of a desired incoming acoustic wave into an undesired spurious wave. For example, where the substrate is formed of glass, the inlay material may be formed of a metallic frit or conductive composition such as silver frit, Conductor Composition 7713 made by DuPont or Conductive Composition 590-G made by Electro Science Laboratories, Inc. These materials are in the form of a paste that may be applied to the array 14 such that each of the arrays variable depth is filled with reflective elements 16. Any excess paste is then scraped off, a process known as doctor blading, and the array is fired in accordance with the manufacturer's instructions.

Figure 3:
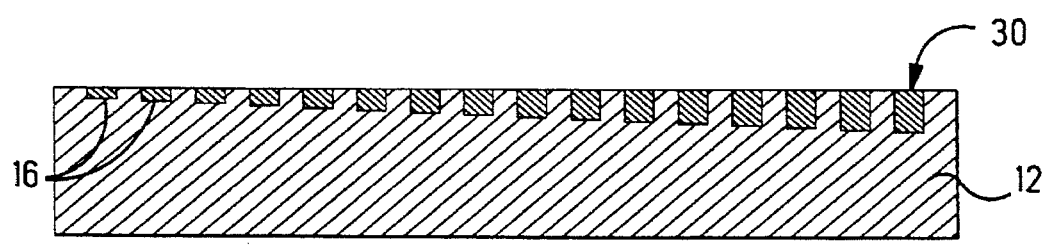
FIG. 3 is a cross-sectional view of a touch panel substrate as shown in FIG. 2 with an inlaid reflective array.

An inlaid reflective array as shown in FIG. 3 has a number of advantages over the array shown in FIG. 2. First, the inlaid array is more effective in acoustic wave guiding or beam trapping. This improved wave guiding effect of the inlaid arrays allows the arrays to maintain the acoustic waves along lines of latitude when the substrate 12 is curved instead of flat. This is extremely important because it is very difficult to guide acoustic waves along lines of latitude in curved substrate panels. Further, the improved acoustic wave guiding allows larger acoustic wave panels to be made than has heretofore been practical. Another important feature of the inlaid array is its ability to minimize conversion of the incoming acoustic wave into an undesired, spurious acoustic wave. For example, it has been found that with Shear waves, the known screened reflective arrays may generate some spurious Lamb waves in the acoustic wave touch panel which are undesirable. The inlaid arrays minimize conversion of an incoming Shear wave to a spurious Lamb wave so that as much Shear wave energy as possible is reflected by each of the reflective elements 16 across the touch region of the acoustic wave touch panel.

Figure 4:
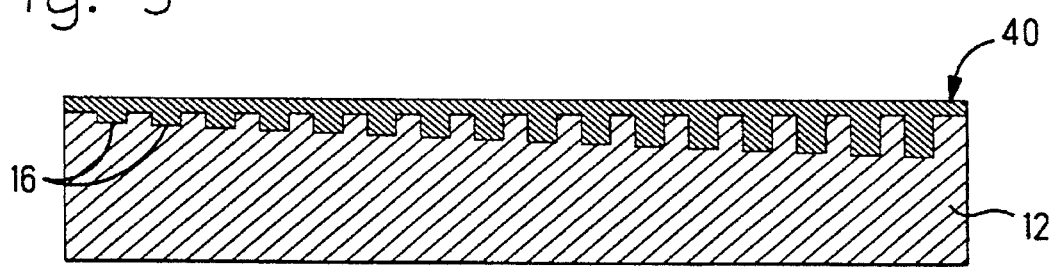
FIG. 4 is a cross-sectional view of the acoustic wave touch panel shown in FIG. 2 with an inlaid array and a strip of inlay material overlying the reflective array.

FIG. 4 illustrates another embodiment of the inlaid reflective array 14 of the present invention. The inlaid reflective array shown in FIG. 4 is the same as that shown in FIG. 3 with the addition of a strip 40 overlying the length and width of the reflective array wherein the strip 40 is formed of the same material used as the inlay for the reflective elements 16. The strip 40 overlying the inlaid reflective array increases the mass loading effect of the array for improved acoustic wave beam guiding. Moreover, this includes mass loading on the other side of the array.

In order to cost-effectively manufacture acoustic wave touch panels having variable depth arrays, the system depicted in FIG. 5 may be utilized. As shown therein, a number of acoustic wave touch panel substrates 12, 42 and 44 are supported by a substrate support fixture 46 over an etch tank 48 that is filled with an etching solution 50. The substrate fixture 46 is moved up and down along a vertical axis by a controller 52. The controller 52 includes a processor, not showing that controls the rate at which the substrate support fixture 46 is moved. The processor, thereby, controls the rate of immersion of the substrates 12, 42 and 44 into the etching solution 50. Furthermore, the processor controls the rate of withdrawal of the substrates from the etching solution so as to provide the desired depth profile of each reflective array inlay 15. As can be seen, as the distance between a reflective array inlay 15 and the substrate support fixture 46 increases, the time that the reflective array inlay 15 is in the etching solution 50 also increases. This time increases in the etching solution 50 increases the depth of the reflective array inlay 15 in the substrate 12, 42, 44. By controlling the rate of withdrawal from or immersion into, the etching solution 50 of the substrates, 12, 42, 44 the desired depth profile of the reflective array inlay 15 is obtained.

It is also noted that, because the length of each reflective array element 14 is not perpendicular to the direction of movement of the substrate 12 when it is immersed and withdrawn from the etching solution 50, depending upon the rate of withdrawal and immersion of the particular etching solution utilized, it is possible that the depth of a single reflective array inlay 15 may not be uniform along its length. In such an event, the substrate 12 may be supported by the substrate support fixture 46 as depicted in FIG. 5 so that the reflective elements 16 are perpendicular to the direction of movement of the substrate 12 into and out of the etching solution 50. This will ensure uniform depth across the length of each individual reflective array inlay 15.

Prior to the etching of a reflective array 14, and its inlays 15 on the acoustic wave touch panel, some preparation is needed. First, it is preferable that the glass substrate be cut to the desired size the acoustic wave touch panel. Thereafter, the edges of the substrate should be polished and/or otherwise finished. Next, an etch resist should be applied to the panel to allow the pattern of the reflective elements forming the array to be formed in the panel by the immersion thereof into the etch tank as described above. The etch resist can be applied in any one of a number of conventional ways. For example, the etch resist may be screened printed in the desired reflective array pattern onto the panel. More particularly, the resist is put in all of the areas over the panel where etching is not to take place. In this process for example an etch resist that may be used in an Alkali resistant/removable etching plating resist known as Hysol ER1006R. Another method of applying the etch resist is to coat the entire acoustic wave touch panel with a photo mask such as Photoposit SP20 photo resist. Thereafter, the panel is exposed to ultraviolet light with a negative of the reflective array pattern positioned over the acoustic wave touch panel substrate so that all of the areas defining the reflective elements of the array that are to be etched are exposed to the ultraviolet light. Next, the reflective array pattern is developed on the panel using a sodium hydroxide solution. Once the reflective array pattern is applied to the acoustic wave touch panel, the panel is ready for immersion into the etching solution 50. The etching solution may be one of a number of known solutions, for example a buffered oxide etchant or BOE solution.

Variable depth reflective arrays may also be easily formed in a plastic substrate by stamping the substrate with a tool having the desired depth profile. Some suitable plastic substrates for acoustic waves such as with shear wave are polystyrene and acrylic and other materials are possible. After the plastic substrates are stamped to form the variable depth reflective array, the array may be inlaid with a different material as described above so as to improve the wave guiding properties of the array and to suppress spurious waves from being generated by the arrays.

Since changes may be made in the above-described apparatus and method without departing from the scope of the present invention, it is intended that the above description and the drawing be interpreted as illustrative and not in a limiting sense.

What is claimed and desired to be secured by Letters Patent is:

1. An acoustic wave touch panel comprising:
   a substrate formed of a first material, said substrate capable of supporting an acoustic wave for propagation therein;
   a reflective array for reflecting an acoustic wave propagating in said substrate, said reflective array being formed in said substrate; and
   an inlay formed of a second material, said inlay being disposed in said reflective array wherein said acoustic wave has a velocity of propagation in said second material that is slower than the velocity of propagation of said acoustic wave in said first material.

2. An acoustic wave touch panel as recited in claim 1 wherein said first material is a glass and said second material is a frit composition.

3. An acoustic wave touch panel as recited in claim 2 wherein said second material is a metallic frit.

4. An acoustic wave touch panel as recited in claim 2 wherein said second material is a silver frit.

5. An acoustic touch panel as recited in claim 1 wherein said reflective array is etched in said substrate.

6. An acoustic wave touch panel comprising:
   a substrate formed of a first material, said substrate capable of supporting an acoustic wave for propagation therein;
   a reflective array for reflecting an acoustic wave propagating in said substrate, said reflective array being stamped in said substrate; and
   an inlay formed of a second material, said inlay being disposed in said array wherein said acoustic wave has a velocity of propagation in said second material that is slower than the velocity of propagation of said acoustic wave in said first material.

7. An acoustic wave touch panel as recited in claim 6 wherein said first material is a plastic.

8. An acoustic wave touch panel as recited in claim 7 wherein said first material is a polystyrene.

9. An acoustic wave touch panel as recited in claim 7 wherein said first material is an acrylic.

10. An acoustic wave touch panel comprising:
    a substrate formed of a first material, said substrate capable of supporting an acoustic wave for propagation therein;
    a reflective array for reflecting an acoustic wave propagating in said substrate, said reflective array being formed by the removal of portions of said substrate in a pattern defining said array; and
    an inlay formed of a second material, said inlay being disposed in said etched array wherein said acoustic wave has a velocity of propagation in said second material that is slower than the velocity of propagation of said acoustic wave in said first material.

11. An acoustic wave touch panel as recited in claim 9 wherein said second material is a metallic frit.

12. An acoustic wave touch panel as recited in claim 11 wherein said second material is a silver frit.

13. An acoustic wave touch panel as recited in claim 10 wherein said first material is a plastic.

14. An acoustic wave touch panel as recited in claim 13 wherein said first material is a polystyrene.

15. An acoustic wave touch panel as recited in claim 13 wherein said first material is an acrylic.

16. An acoustic wave touch panel as recited in claim 13 including a layer of said second material overlying at least a portion of said array on a surface of said substrate.

17. An acoustic wave touch panel comprising:
    a substrate formed of a first material, said substrate capable of supporting an acoustic wave for propagation therein;
    a variable depth reflective array formed in said substrate for reflecting an acoustic wave propagating in said substrate;
    an inlay formed of a second material deposited in said array; and
    a strip of said second material overlying said array on a surface of said substrate.

18. An acoustic wave touch panel comprising:
    a substrate formed of a first material having a shear modulus, said substrate being capable of supporting a shear wave for propagation therein;
    a reflective array for reflecting a shear wave propagating in said substrate, said reflective array being formed by the removal of portions of said substrate in a pattern defining said array; and
    an inlay formed of a second material having a density and a shear modulus, said inlay being disposed in said array wherein the ratio of the density to shear modulus of said second material is different than the ratio of the density to shear modulus of said first material.

19. An acoustic wave touch panel as recited in claim 18 including a strip of said second material overlying said array on a surface of said substrate.

20. An acoustic wave touch panel comprising:
    a polystyrene substrate; and
    a variable depth reflective array formed in said substrate along an axis of said acoustic wave touch panel, said substrate capable of supporting a shear wave for propagation therein.

21. An acoustic wave touch panel comprising:

a acrylic substrate; and a variable depth reflective array formed in said substrate along an axis of said acoustic wave touch panel, said substrate capable of supporting a shear wave for propagation therein.

22. An acoustic wave touch panel comprising:

a nylon substrate; and a variable depth reflective array formed in said substrate along an axis of said acoustic wave touch panel, said substrate capable of supporting a shear wave for propagation therein.

23. An acoustic wave touch panel comprising:

a polyethylene substrate; and a variable depth reflective array formed in said substrate along an axis of said acoustic wave touch panel, said substrate capable of supporting a shear wave for propagation therein.

24. A method of making an acoustic wave touch panel having a substrate capable of supporting an acoustic wave for propagation therein, said substrate being formed of a first material, said method comprising:

removing portions of said substrate in a pattern to form at least one reflective array; and depositing in said array a second material wherein said acoustic wave has a velocity of propagation in said second material that is different than the velocity of propagation of said acoustic wave in said first material.

25. A method of making an acoustic wave touch panel as recited in claim 24 wherein said first material is a glass and said step of removing includes etching said reflective array pattern in said substrate.

26. A method of making an acoustic wave touch panel as recited in claim 24 wherein said first substrate is plastic and said step of removing includes stamping and reflective array pattern in said substrate.

27. A method of making an acoustic wave touch panel having a substrate capable of supporting an acoustic wave for propagation therein, said substrate being formed of a first material comprising:

preparing said substrate for etching of a predetermined pattern representing an array of reflective elements;

immersing said substrate in an etching solution;

withdrawing said substrate at a controlled non-constant rate representing a variable depth profile of said array to form said array of reflective elements; and depositing in said array a second material wherein said acoustic wave has a velocity of propagation in said second material that is slower than the velocity of propagation of said acoustic wave in said first material.

28. A method of making an acoustic wave touch panel having a substrate capable of supporting an acoustic wave for propagation therein, said substrate being formed of a first material comprising:

preparing said substrate for etching of a predetermined pattern representing an array of reflective elements;

immersing said substrate in an etching solution; and withdrawing said substrate at a controlled non-constant rate representing a variable depth profile of said array to form said array of reflective elements.

29. A method of making an acoustic wave touch panel having a substrate capable of supporting an acoustic wave for propagation therein, said substrate being formed of a first material comprising:

preparing said substrate for etching of a predetermined pattern representing an array of reflective elements;

immersing said substrate in an etching solution at a controlled non-constant rate representing a variable depth profile of said array to form said array of reflective elements; and withdrawing said substrate for said etching solution.

30. A method of making an acoustic wave touch panel having a substrate capable of supporting an acoustic wave for propagation therein, said substrate being formed of a first material comprising:

preparing said substrate for etching of a predetermined pattern representing an array of reflective elements;

immersing said substrate in an etching solution;

withdrawing said substrate at a controlled non-constant rate representing a variable depth profile of said array to form said array of reflective elements; and depositing in said array a second material wherein a ratio of the density to shear modulus of said second material is greater than the ratio of the density to shear modulus of said first material.

\* \* \* \* \*